United States Patent
Abe et al.

(10) Patent No.: US 8,279,352 B2
(45) Date of Patent: Oct. 2, 2012

(54) VIDEO DISPLAY DEVICE AND LUMINANCE RANGE CORRECTION METHOD

(75) Inventors: Masatoshi Abe, Tokyo (JP); Yutaka Arai, Tokyo (JP); Hiroki Iwataka, Nagasaki-ken (JP)

(73) Assignees: NEC Display Solutions, Ltd., Tokyo (JP); Mitsubishi Electric Control Software Corporation, Hyogo-Ken (JP)

( * ) Notice: Subject to any disclaimer, the term of this patent is extended or adjusted under 35 U.S.C. 154(b) by 1056 days.

(21) Appl. No.: 12/279,155

(22) PCT Filed: Feb. 15, 2007

(86) PCT No.: PCT/JP2007/052748
§ 371 (c)(1),
(2), (4) Date: Aug. 12, 2008

(87) PCT Pub. No.: WO2007/094417
PCT Pub. Date: Aug. 23, 2007

(65) Prior Publication Data
US 2009/0015728 A1 Jan. 15, 2009

(30) Foreign Application Priority Data
Feb. 15, 2006 (JP) ................................. 2006-037747

(51) Int. Cl.
*H04H 5/52* (2006.01)

(52) U.S. Cl. ........................ 348/678; 348/674; 348/739
(58) Field of Classification Search ................. 348/674, 348/678, 739; 345/690
See application file for complete search history.

(56) References Cited

U.S. PATENT DOCUMENTS

| 2005/0151883 A1* | 7/2005 | Arai et al. .................... 348/572 |
| 2005/0180629 A1* | 8/2005 | Masuno et al. ............... 382/169 |
| 2007/0081720 A1* | 4/2007 | Ok et al. ....................... 382/162 |

FOREIGN PATENT DOCUMENTS

| JP | 2004-246118 A | 9/2004 |
| JP | 2005-121875 A | 5/2005 |
| JP | 2005-196087 A | 7/2005 |

* cited by examiner

*Primary Examiner* — Pankaj Kumar
*Assistant Examiner* — Mulugeta Mengesha
(74) *Attorney, Agent, or Firm* — Sughrue Mion, PLLC (57) ABSTRACT

In a video display device of the present invention, a main control unit is equipped with a user interface for varying correction values set to a range correction unit and controls a range correction unit by acquiring the corresponding correction values from a storage unit in accordance with correction level information input by the user interface. The storage unit stores range correction values for the video display unit in correspondence with each piece of the correction level information input by the user interface. Thus, it is possible to correct luminance ranges to suit the user's preference without causing a large luminance reduction.

10 Claims, 9 Drawing Sheets

| ALLOWABLE CHROMINANCE RANGE | : | $x = \pm 0.001$ |
| --- | --- | --- |
| | : | $y = \pm 0.001$ |
| ALLOWABLE LUMINANCE RANGE | : | $Y = \pm 10 \text{cd/m}^2$ |

VIDEO DISPLAY DEVICE AND LUMINANCE RANGE CORRECTION METHOD

TECHNICAL FIELD

The present invention relates to video display devices and luminance range correction methods, which correct luminance dispersions and chrominance dispersions (hereinafter, simply referred to as luminance ranges) embraced by display devices.

The present application claims priority on Japanese Patent Application No. 2006-37747 filed on Feb. 15, 2006, the content of which is incorporated herein by reference.

BACKGROUND ART

Figure 8:
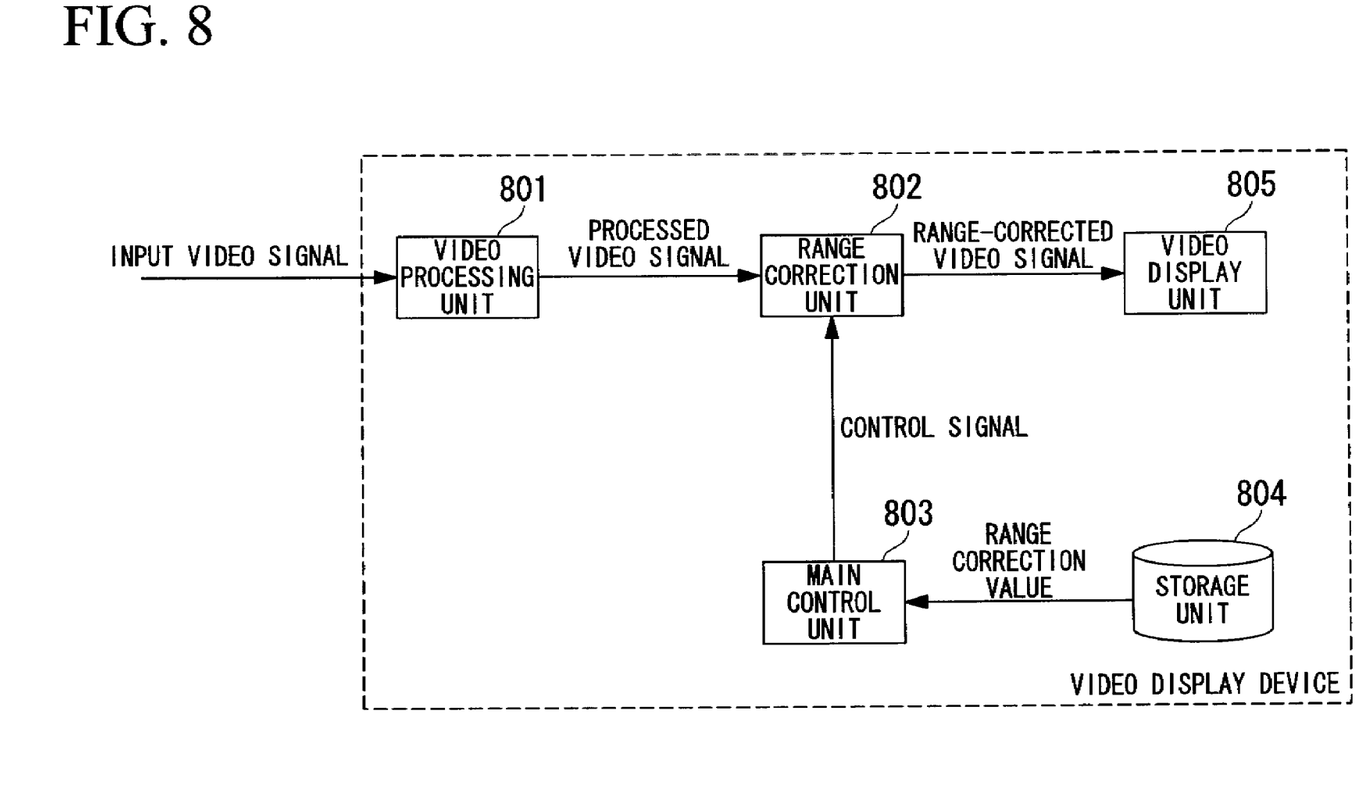
FIG. 8 A block diagram showing the internal constitution of a conventionally-known video display device.
Figure 9:
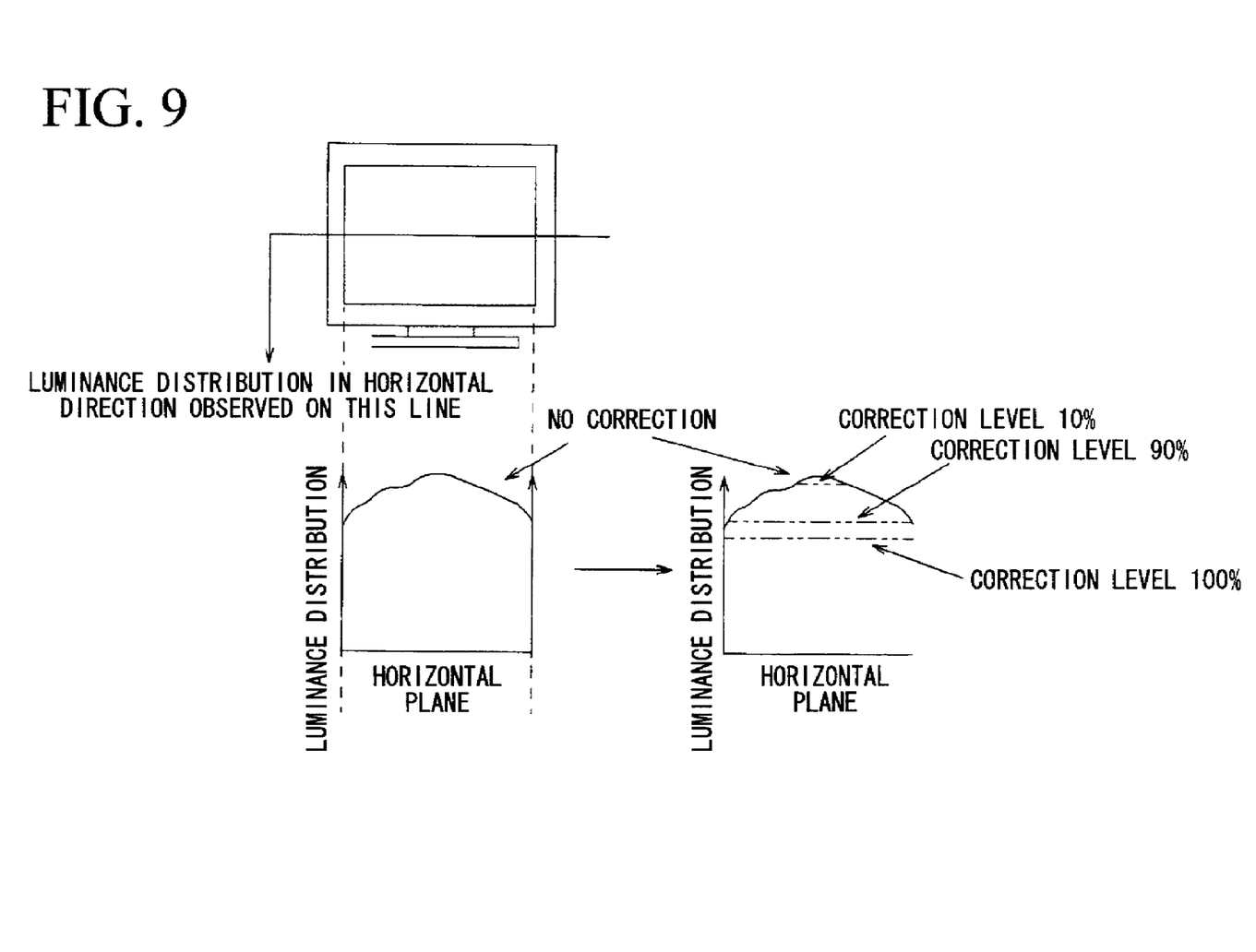
FIG. 9 A diagram showing luminance distributions of the conventionally-known video display device.

FIG. 8 is a block diagram showing the constitution of a conventionally-known video display device that can correct luminance ranges of a display device. FIG. 9 is a diagram showing the luminance distribution in a horizontal direction (a horizontal plane).

As shown in FIG. 8, the conventionally-known video display device is constituted of a video processing unit 801, a range correction unit 802, a main control unit 803, a storage unit 804, and a video display unit 805.

In the above constitution, input video signals are processed by the video processing unit 801, which then produces processed video signals and outputs them to the range correction unit 802. The storage unit 804 stores correction values for correcting the characteristics of the individual luminance ranges of the video display unit 805 in advance. The main control unit 803 reads correction values from the storage unit 804 so as to control the range correction unit 802. The range correction unit 802 corrects processed video signals so as to eliminate the individual luminance ranges of the video display unit 805; then, it outputs range-corrected video signals, which are produced after luminance ranges are corrected, to the video display unit 805. Thus, the video display unit 805 displays video images having no luminance range.

The above conventionally-known technology corrects the luminance ranges so that a bright area is forced to match a dark area in luminance, wherein after the luminance range correction, the overall luminance of the display screen may be greatly reduced since the correction is performed to achieve 100% non-luminance range.

The known method teaches that the overall area of the display screen is not subjected to a non-luminance range condition as indicated by "correction level 100%" in FIG. 9, but a single target luminance value is set for luminance range correction, then, luminance is reduced to the target luminance range only when the present luminance is higher than the preset luminance value (see Patent Document 1, for example). For example, when the target luminance value is set to a certain luminance value indicated by "correction level 10%", it is possible to suppress a luminance reduction to 10% compared with a luminance reduction adapted to "100% range correction".

Patent Document 1: Japanese Unexamined Patent Application Publication No. 2005-196087

DISCLOSURE OF INVENTION

Problem to be Solved by the Invention

However, according to the above technology disclosed in Patent Document 1, luminance ranges may be varied such that they are gradually corrected from the center area to the peripheral area; hence, no luminance range remains in the corrected area, but the original luminance ranges remain in the non-corrected area.

In the case of "correction level 90" which is close to 100% range correction, completely no luminance range remains in the corrected area except for the peripheral area, but linear luminance differences, which do not exist originally, apparently appear because of a relatively high luminance deviation occurring on the boundary between the corrected area and the non-corrected area. Due to the setting of a single target luminance value, there is a new problem in that the luminance range and luminance reduction cannot be changed to suit the user's preference.

The present invention is made in consideration of the above circumstances; hence, it is an object of the present invention to provide a video display device and a luminance range correction method, which are capable of correcting luminance ranges to suit the user's preference without causing a relatively large luminance reduction.

Means for Solving the Problem

In order to solve the aforementioned problem, the video display device of the present invention is constituted of a video processing unit for processing input video signals, a video display unit for displaying processed video signals output from the video processing unit, a storage unit for storing correction values for correcting luminance ranges of display pixels in the video display unit, a range correction unit for correcting the luminance ranges of the video display unit based on the processed video signals output from the video processing unit, a user interface for varying the correction values set to the range correction unit, and a main control unit for controlling the range correction unit by acquiring the correction values from the storage unit in accordance with the correction level information input by the user interface.

In the video display device of the present invention, it is preferable that the storage unit stores the correction values for the video display unit in correspondence with correction level information input and acquired via the user interface.

In the video display device of the present invention, it is possible for the storage unit to store a single correction value, so that the main control unit acquires the correction values from the storage unit so as to calculate a plurality of range correction values in accordance with the correction level information acquired by the user interface, thus outputting it to the range correction unit.

In the video display device of the present invention, it is possible for the storage unit to store n correction values (n is a positive integer), so that the main control unit calculates correction values based on the n correction values in accordance with m pieces of correction level information (where m>n) input and acquired by the user interface, thus outputting them to the range correction unit.

In the video display device of the present invention, the main control unit acquires the correction level information input by the user interface, calculates the ideal luminance range distribution characteristics based on ideal luminance distribution characteristics approximating standard luminance distributions of the video display unit, and calculates an optimized correction value corresponding to the acquired correction level information based on a correlation between a 100% luminance range correction value at certain point and a 100% luminance range correction value of a display screen of the video display unit, based on the ideal luminance range distribution characteristics, thus outputting it to the range correction unit.

In the video display device of the present invention, the main control unit calculates the ideal luminance distribution characteristics with respect to each video display unit to be used.

In the video display device of the present invention, the main control unit further performs a filter operation so as to extract and smooth pixels having large variations of luminance ranges in the video display unit.

A video display device according to another embodiment of the present invention is constituted of a video processing unit for processing input video signals, a video display unit for displaying the processed video signals output from the video processing unit, a storage unit for storing correction values for correcting luminance ranges of display pixels in the video display unit, a range correction unit for correcting the luminance ranges of the video display unit based on the processed video signals output from the video processing unit, a user interface for inputting allowable luminance ranges input thereto, a main control unit for acquiring the correction values from the storage unit based on the allowable luminance ranges input by the user interface, thus outputting them to a range correction calculation unit, and the range correction calculation unit for acquiring the correction values from the storage unit under control of the main control unit and for calculating the correction values within the allowable luminance ranges input by the user interface.

In the video display device according to another embodiment of the present invention, it is preferable for the user interface to input information regarding either luminance, chrominance, or both of luminance and chrominance as allowable luminance ranges so as to output it to the main control unit.

A luminance range correction method of the present invention is adapted to a video display device in which a control unit acquires correction data for correcting luminance ranges of display pixels of a display device from a storage unit so as to correct individual luminance ranges of the display device, wherein the control unit implements a step for acquiring luminance range correction level information input by a user interface, a step for calculating ideal luminance range distribution characteristics based on ideal luminance distribution characteristics approximating standard luminance distributions of the display device, a step for calculating an optimized luminance range correction value corresponding to the acquired luminance range correction level based on a correlation between a 100% luminance range correction value at certain point and a 100% luminance range correction value in a display screen of the display device based on the ideal luminance range distribution characteristics, and a step for correcting individual luminance ranges of the display device based on the calculated luminance range correction value.

Effect of the Invention

According to the present invention, luminance ranges are corrected based on correction values, which are acquired in accordance with the correction level information input by the use interface; this makes it possible to correct luminance ranges to suit the user's preference without causing a large luminance reduction.

DESCRIPTION OF THE REFERENCE NUMERALS 101 video processing unit
102 range correction unit
103 main control unit
104 storage unit
105 video display unit
606 user interface
607 range correction calculation unit

BEST MODE FOR CARRYING OUT THE INVENTION

First Embodiment

Figure 1:
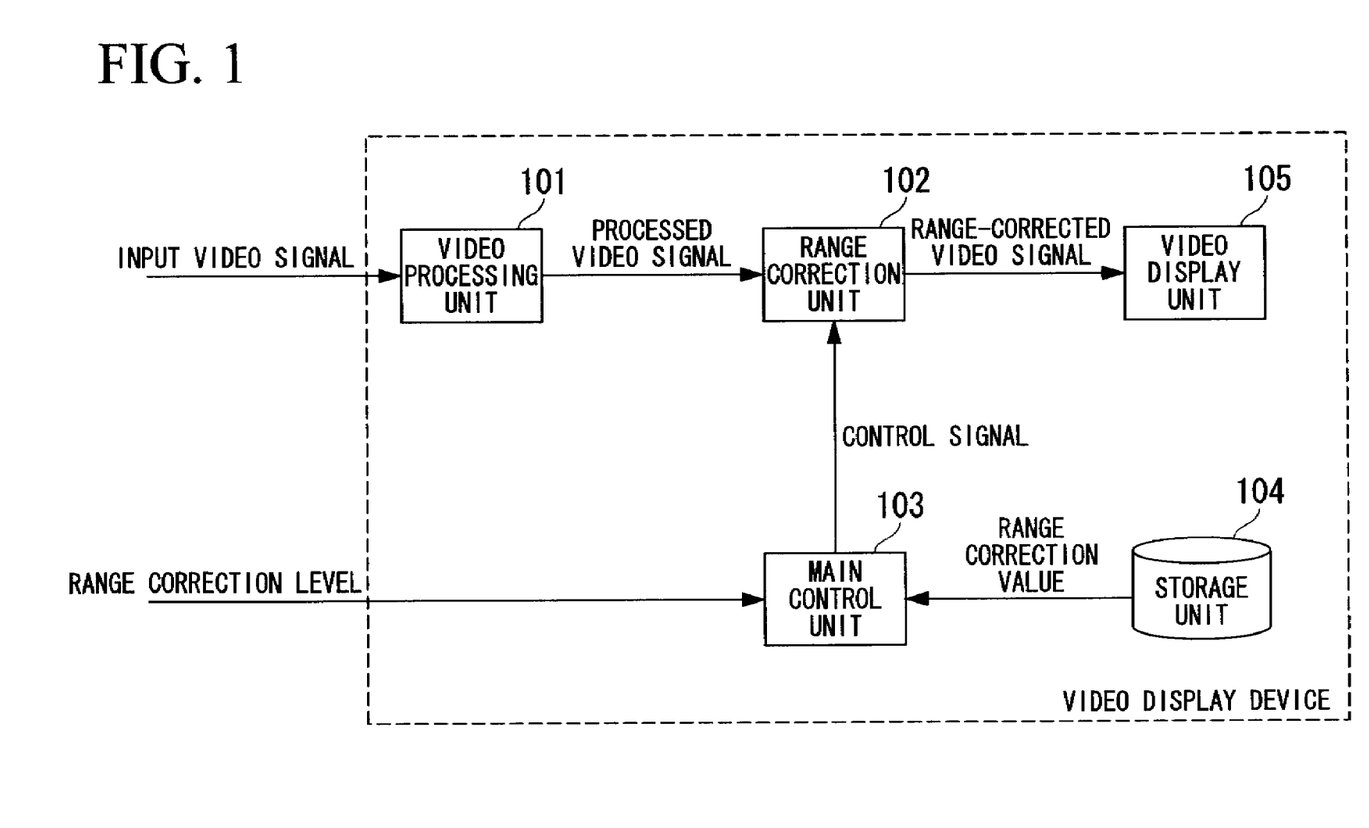
FIG. 1 A block diagram showing the internal constitution of a video display device according to a first embodiment of the present invention.

FIG. 1 is a block diagram showing the internal constitution of a video display device according to a first embodiment of the present invention.

The video display device of the first embodiment of the present invention is constituted of a video processing unit 101 for processing input video signals, a video display device 105 for displaying processed video signals output from the video processing unit 101, a storage unit 104 for storing correction values for correcting luminance ranges between display pixels in the video display device 105, a range correction unit 102 for correcting luminance ranges of the video display unit 105 based on processed video signals output from the video processing unit 101, and a user interface allowing corrections values set to the range correction unit 102 to be varied, and a main control unit 103 for controlling the range correction unit 102 in response to correction values, which are read from the storage unit 104 based on the correction level information input and acquired by the user interface.

Figure 2:
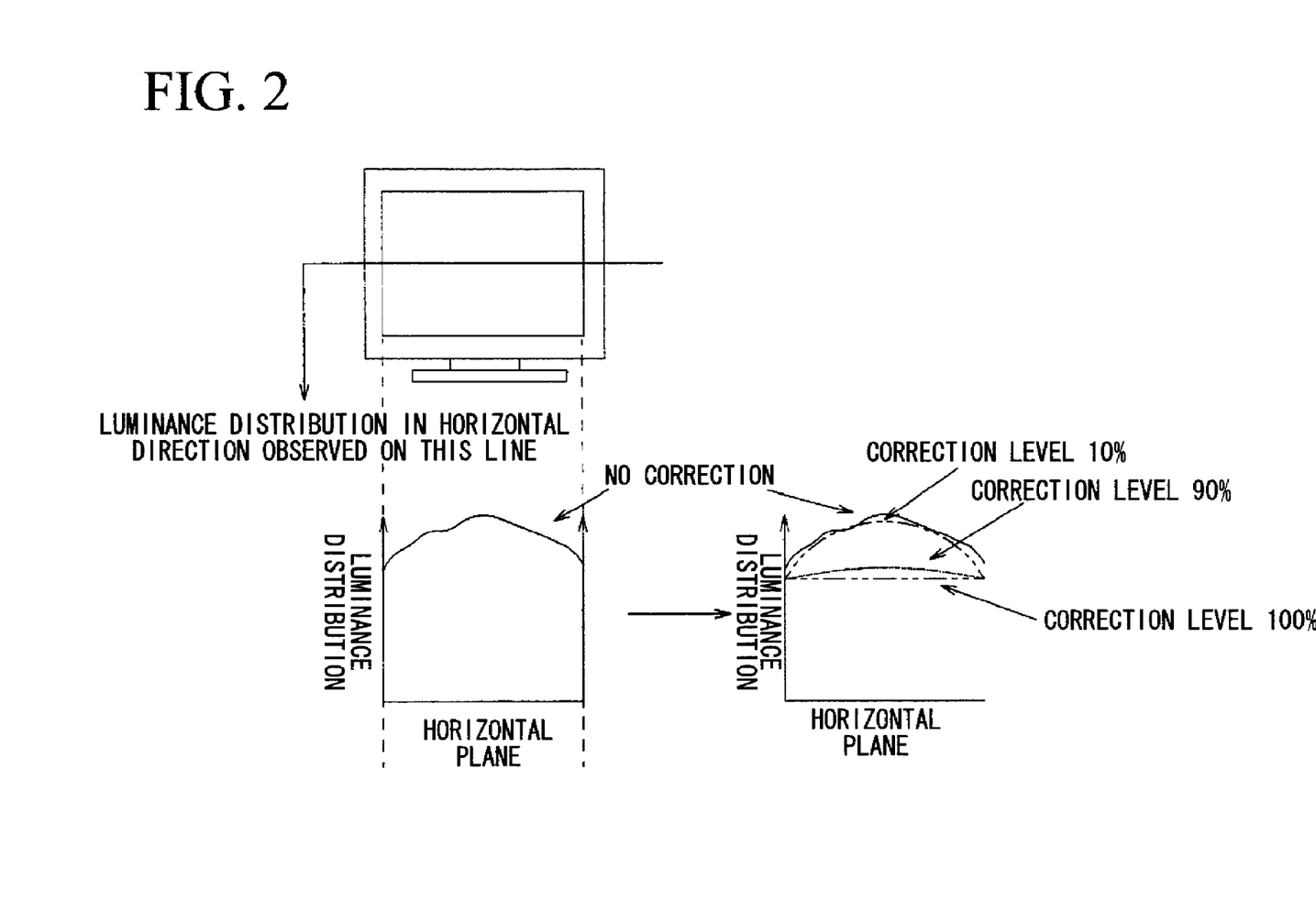
FIG. 2 A diagram showing the luminance distributions of the video display device according to the first embodiment of the present invention.

FIG. 2 is a diagram showing luminance distributions of a certain horizontal plane of the video display device shown in FIG. 1, which shows the luminance distribution with respect to the condition (100%) for completely correcting luminance ranges, and the luminance distributions in which luminance ranges are corrected by 10% and 90%.

Figure 3:
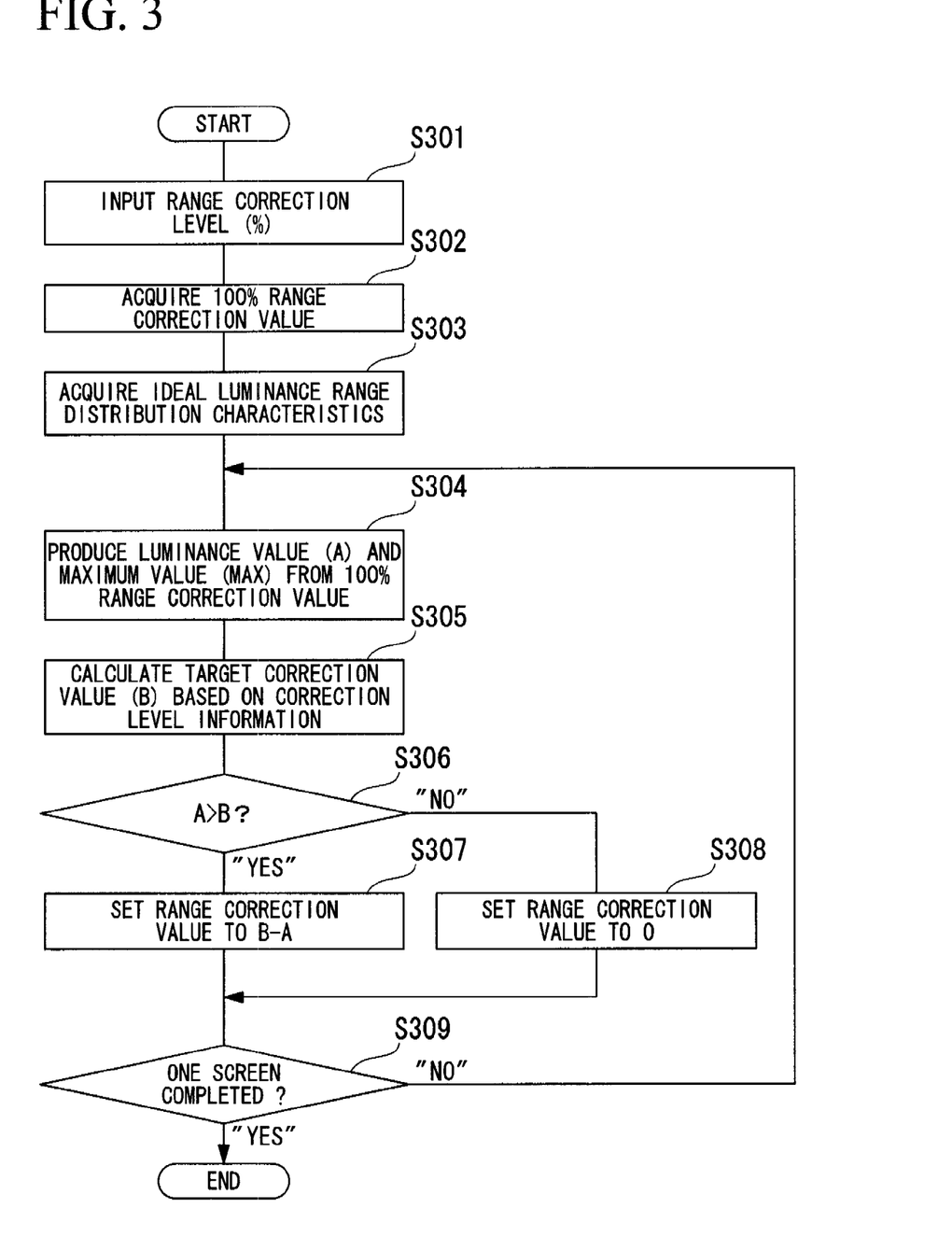
FIG. 3 A flowchart showing an algorithm for producing a luminance range correction value by the video display device according to the first embodiment of the present invention.

FIG. 3 is a flowchart showing procedures for calculating correction values in a step-by-step manner, which also indicates procedures achieving the luminance range correction method of the present invention.

Hereinafter, the operation of the video display device of the first embodiment of the present invention shown in FIG. 1 will be described in detail with reference to FIGS. 2 and 3.

First, input video signals are supplied to the video processing unit 101. The video processing unit 101 processes input video signals and converts them into signals, which can be applied to the display device of the video display unit 105 and which are then output to the range correction unit 102. The main control unit 103 reads correction values for correcting the characteristics of individual luminance ranges of the video display unit 105 from the storage unit 104.

The storage unit 104 stores not only correction values achieving 100% correction for completely eliminating luminance ranges, but also stores correction values, which are optimized with respect to each correction level information which will be described later. For example, when the user inputs correction level information via the on-screen menu and via other interfaces, the main control unit 103 reads correction values suiting the correction level information from the storage unit 104 so as to control the range correction unit 102, thus appropriately correcting luminance ranges of the video display unit 105.

FIG. 2 is a diagram showing the luminance distributions in one horizontal direction in a non-correction mode, in which luminance ranges may still remain. It also shows the luminance distributions with regard to 10%, 90%, and 100% corrections as examples of corrections based on the following correction value calculation method.

Herein, in consideration of the characteristics of luminance ranges originally possessed by the display device, there is provided a luminance range correction method in which the luminance ranges in the overall screen area of the display device are smoothly varied and are then eliminated as the correction level information increases. According to this method, it is possible to correct luminance ranges such that extremely large luminance differences apparently appear on the display screen in a desired step of the range correction level.

Hereinafter, procedures for producing optimized correction values will be described with reference to the flowchart of FIG. 3.

First, the main control unit 103 acquires the preset correction level information (%) by use of the user interface provided by the user (step S301: range correction level setting (for inputting percentage). Subsequently, the main control unit 103 acquires the 100% range correction value from the storage unit 104 (step S302). At this time, the main control unit 103 acquires the ideal luminance range distribution characteristics in a non-correction mode (step S303).

The above ideal luminance range distribution characteristics will be explained. The present invention is characterized by introducing the concept of the ideal luminance range distribution in order to calculate the optimized correction values. The ideal luminance range distribution characteristics are represented by curves shown in FIG. 4A and are approximate to the standard luminance range characteristics of the display device, for example. They are characterized in that the peripheral portion is darkest, while the center portion is brightest. In addition, they are distributed symmetrically with the peak corresponding to the center of the screen in both the horizontal direction and the vertical direction.

Figure 4A:
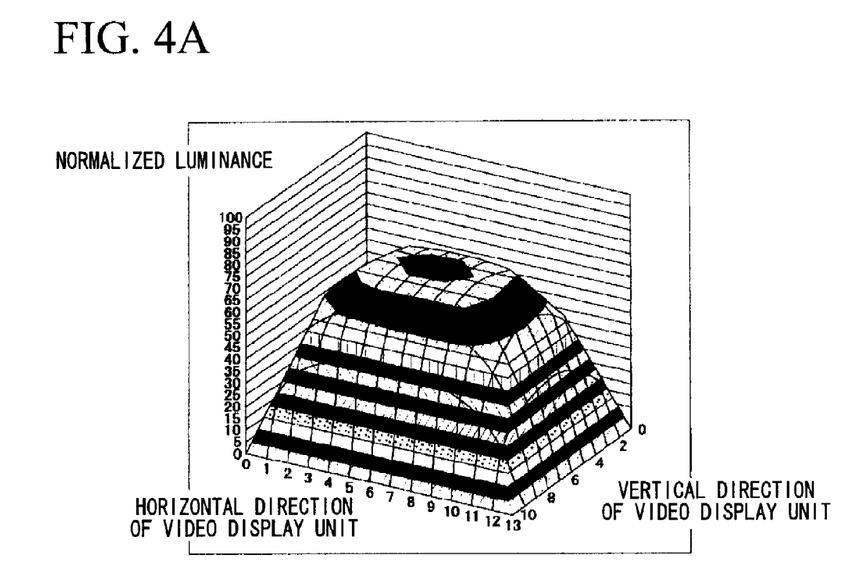
FIG. 4A A graph showing an example of an ideal luminance distribution used in the first embodiment of the present invention.
Figure 4B:
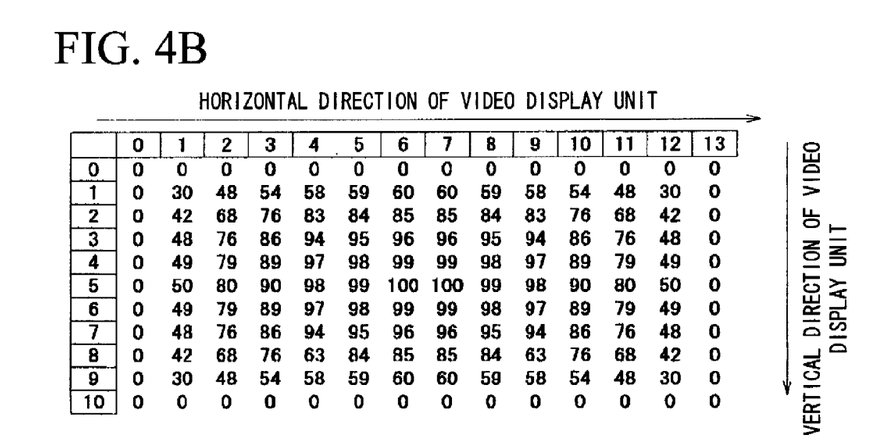
FIG. 4B A figure showing an example of an ideal luminance distribution table used in the first embodiment of the present invention.

The main control unit 103 acquires the ideal luminance distribution characteristics (normalized data of ideal luminance distribution) of the display device in a non-correction mode shown in FIG. 4B in advance, then, it calculates the ideal luminance range distribution characteristics (%). In FIG. 4, the normalized data of ideal luminance distribution is expressed using a matrix of 14×11, which is merely an example and can be thus set to a matrix of m×n (where m and n are natural numbers except "1"). FIG. 4A is a graph showing the normalized data of ideal luminance distribution in a non-correction mode.

Subsequently, the main control unit 103 produces a luminance value based on the 100% range correction value at a certain point of the horizontal plane of the display device, thus producing the maximum value of the 100% range correction value within one screen (step S304). Herein, the luminance value is designated by A, and the maximum value is designated by MAX.

Next, the correlation between the 100% luminance range correction value and the actual luminance range of the display device will be explained. Suppose that the luminance is corrected to decrease as the luminance range correction value decreases, while the luminance is corrected to increase as the luminance range correction value increases. For example, the 100% luminance range correction value is set to "−10" at a certain point, while the 100% luminance range correction value is set to "−5" at another point. At this time, the luminance ranges may be eliminated by setting the respective luminance range correction values only when both the point whose luminance range correction value is "−10" and the point whose luminance range correction value is "−5," are higher in luminance compared with the luminance subjected to 100% correction and only when the point whose luminance range correction value is "−5" is lower in luminance than the point whose luminance range correction value is "−10". Based on this correlation, it is possible to produce the ideal luminance range correction value by use of the ideal luminance range distribution characteristics.

Thus, the target correction value B corresponding to the correction level information input by the user is calculated in accordance with an equation (1) (step S305).

Target Correction Value($B$)=MAX×Ideal Range Correction Value Distribution Characteristics(%)× (100−correction level)(%)     (1)

Subsequently, the main control unit 103 compares the 100% range correction value A read from the storage unit 104 with the target correction value B (step S306); then, it sets B−A as the optimized correction value when the comparison result indicates that A is higher than B (step S307). When B is higher than A, it sets 0 to the correction value (step S308).

The procedures are ended upon a decision as to whether or not the correction value optimization process shown by the foregoing steps S304 to S308 is completed with respect to one screen (S309).

According to the first embodiment of the present invention described above, luminance ranges smoothly vary in the overall area of the display screen when the correction level is varied from 0% to 100%; hence, variations of luminance ranges may not be distinguished by human eyes. It is possible to rapidly eliminate small luminance ranges at any position of the display screen. Since 100% correction operation is performed while sustaining the original characteristics of the display device in which the center is bright but the periphery is dark, it is possible to correct luminance ranges without feelings of differences not only in 100% correction.

Figure 5:
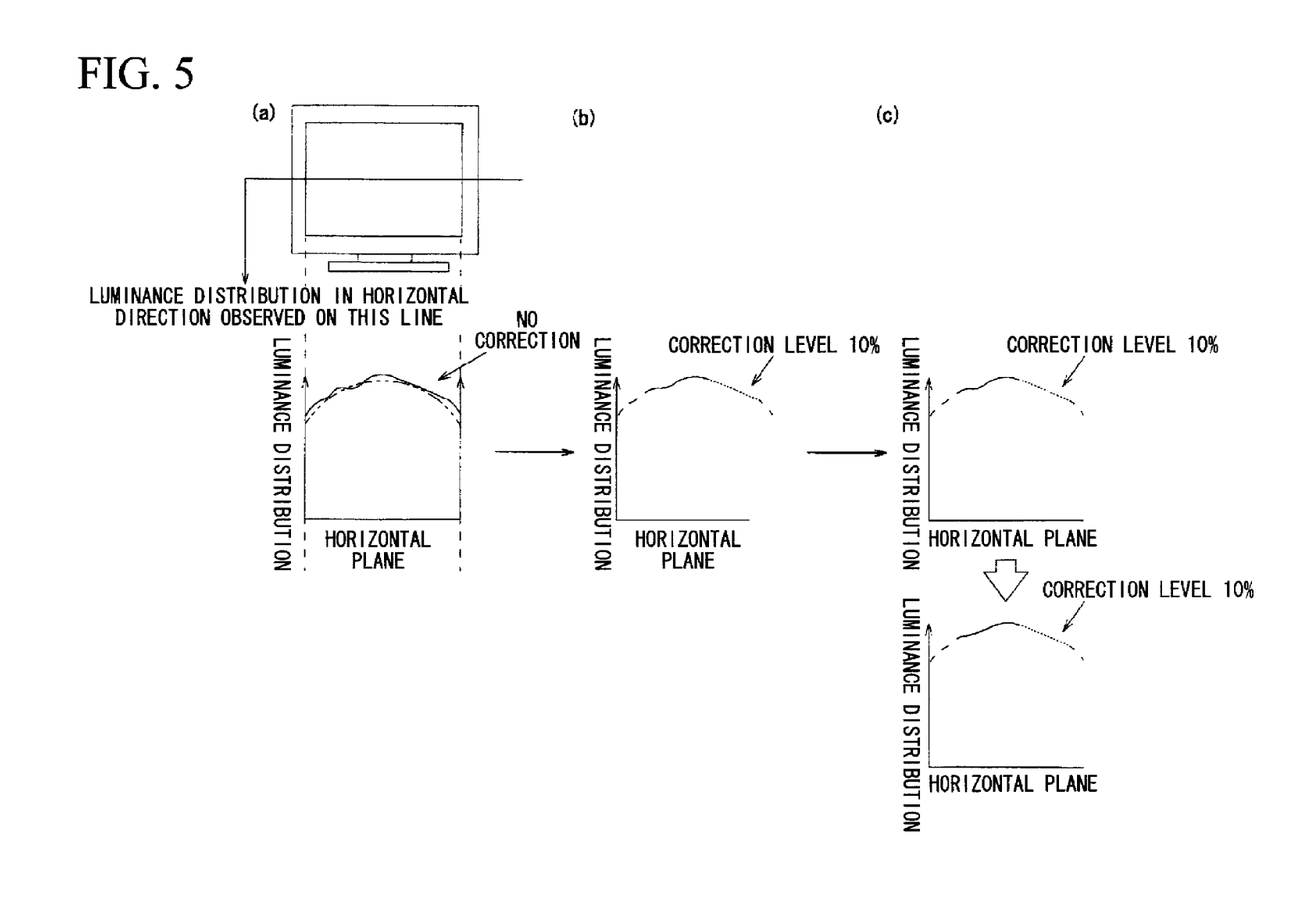
FIG. 5 A diagram showing luminance distributions of the video display device according to the first embodiment of the present invention.

After completion of luminance range correction described above, a relatively large luminance difference occurring between close positions may be distinguished as luminance ranges. For example, in the case of FIG. 5(a) in which the extremely large luminance differences exist, the luminance range correction method of the first embodiment of the present invention correct it as shown in FIG. 5(b) in case of the correction level 10%. This indicates that visually apparent luminance differences may exist after luminance range correction due to large variations of luminance between close positions.

In this case, the main control unit 103 performs filter processing so as to create smooth variations of luminance (solid line), so that luminance differences cannot be distinguished apparently as shown in FIG. 5(c). For example, it can be presumed that the area between the area subjected to luminance range correction and the area not subjected to luminance range correction may be regarded as the corresponding area as shown in FIG. 5(b); alternatively, it is possible to calculate the luminance value after luminance range correction based on the luminance range correction value, thus searching for the corresponding area. In this case, it is necessary to perform filter processing on a certain range of area with reference to the boundary. The filter processing is performed such that variations of luminance, which cannot be distinguished by human eyes, are sustained with reference to the position whose luminance is reduced to the lowest value in the area.

According to the first embodiment of the present invention described above, it is possible to reduce luminance differences as small as possible without greatly reducing luminance.

Even when luminance differences remain, it is possible to make them not be distinguished by human eyes.

The aforementioned first embodiment of the present invention describes the luminance range correction in the horizontal direction only; however, it is obvious that luminance range correction can be similarly performed in the vertical direction. The aforementioned first embodiment of the present invention describes the luminance range correction only; however, chrominance ranges can be corrected similarly. As to chrominance ranges, it is possible to perform correction processing so as to normally eliminate chrominance ranges while varying the degree of luminance ranges as described above. Similar to luminance ranges, it is obvious that chrominance range correction processing can be performed gradually.

The first embodiment of the present invention describes that the ideal luminance distribution characteristics are acquired in advance, whereas it is possible to calculate the ideal luminance distribution characteristics by way of filter processing based on the luminance distribution measured with regard to each individual (display device) such that the luminance is varied smoothly. The ideal luminance distribution characteristics can be determined such that the center region thereof forms a peak, and the right region and the left region thereof or the upper region and the lower region thereof are symmetrically distributed.

It is described such that the storage unit 104 stores all correction values regarding the correction level information in advance, whereas in the setting of corrections values regarding the correction level information while the storage unit 104 stores only the 100% correction value, the main control unit 103 calculates correction values regarding the input correction level information and sets them for the range correction unit 102. This makes it possible to remarkably reduce the storage capacity of the storage unit 104.

The luminance range correction values regarding the correction level information are not calculated based on the 100% correction value only, but it is possible to calculate m correction values of correction level information based on n correction values (where n<m). Thus, it is possible to adjust luminance ranges with a high precision while remarkably reducing the capacity of the storage unit 104.

Second Embodiment

The aforementioned first embodiment of the present invention describes the method in which luminance ranges of the display device are completely corrected and also gradually and apparently corrected. Herein, instead of the method for inputting and setting the correction level information upon the judgment of appearance, a video display device and a luminance range correction method, which ensure inputting and setting of numerical values, will be described.

Figure 6:
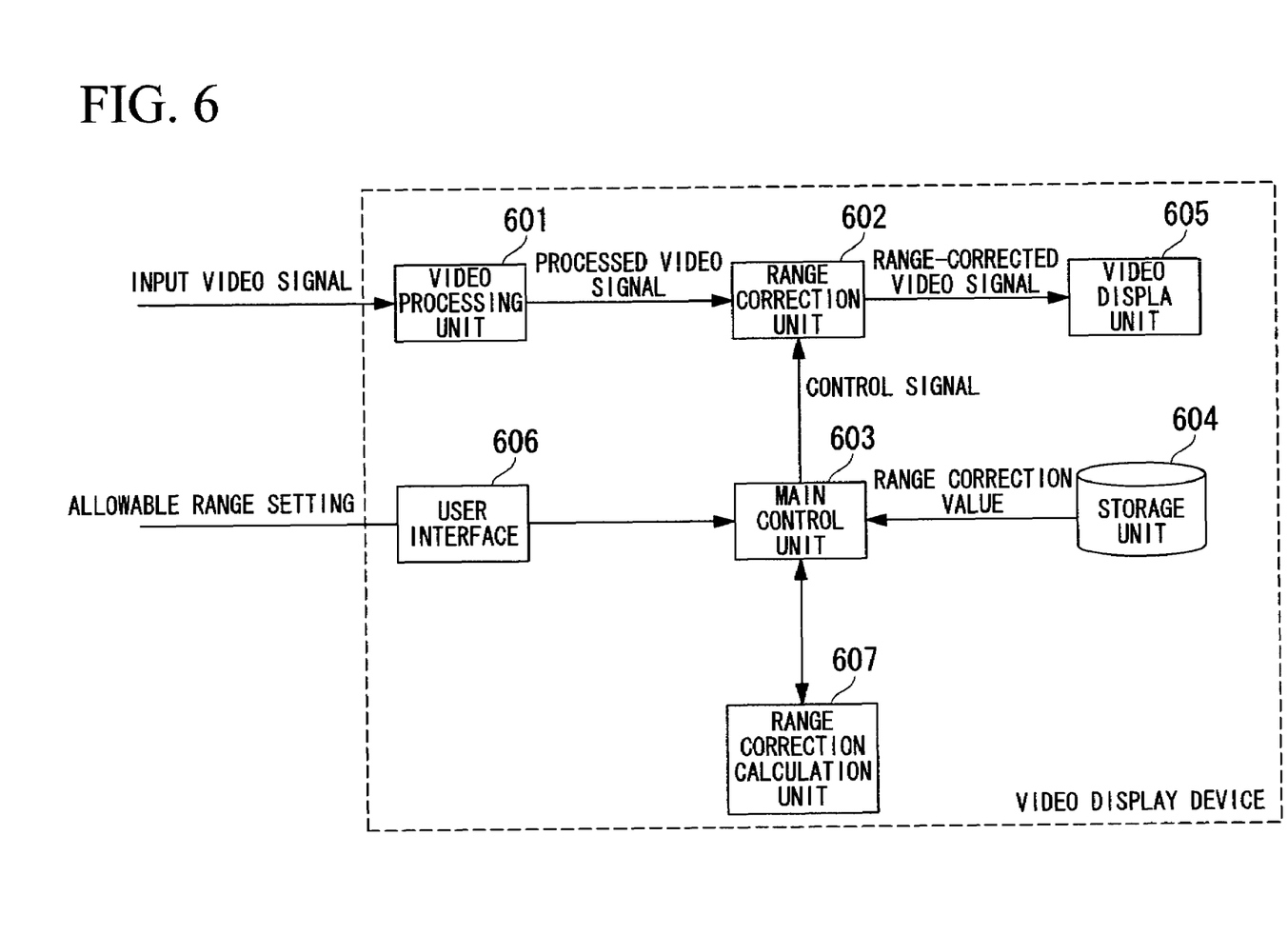
FIG. 6 A block diagram showing the internal constitution of a video display device according to a second embodiment of the present invention.

FIG. 6 is a block diagram showing the internal constitution of the video display device according to the second embodiment of the present invention.

The video display device of the second embodiment is constituted of a video processing unit 601 for processing input video signals, a video display unit 605 for displaying processed video signals output from the video processing unit 601, a storage unit 604 for storing correction values for correcting ranges between display pixels in the video display unit 605, a range correction unit 602 for correcting ranges of the video display unit 605 based on processed video signals output from the video processing unit 601, a user interface 606 for inputting an allowable range, a main control unit 603 which reads the corresponding correction values from the storage unit 604 based on the allowable range input by the user interface 606 so as to output them to a range correction calculation unit 607, and the range correction calculation unit 607 for calculating correction values based on the allowable range input by the user interface 606.

Figure 7:
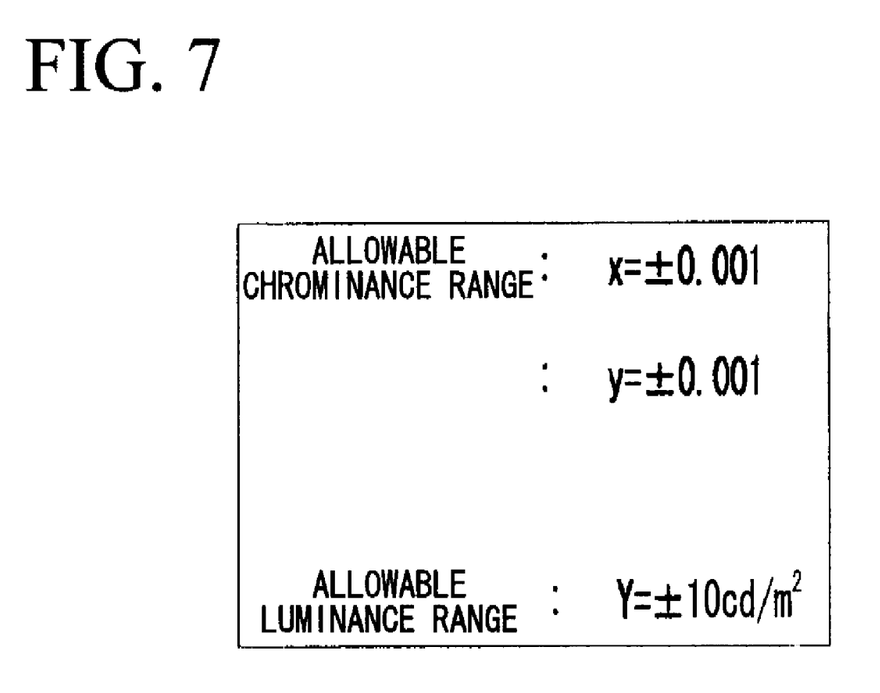
FIG. 7 A figure showing an example of a screen configuration of an on-screen menu used in the second embodiment of the present invention.

FIG. 7 shows an example of a screen image of an on-screen menu provided by the user interface 606.

This example shows the setting of the allowable chrominance range and allowable luminance range. It is possible to set only the allowable chrominance range or only the allowable luminance range.

Hereinafter, the operation of the video display device of the second embodiment of the present invention will be described with reference to FIGS. 6 and 7.

First, the user sets allowable ranges for chrominance x, chrominance y, and luminance Y in view of the on-screen menu shown in FIG. 7. Thus, the user interface 606 inputs the set allowable ranges (allowable chrominance range: x=±0.001, y=±0.001, allowable luminance range: Y=±10 cd/m$^2$) so as to output them to the main control unit 103.

Subsequently, the main control unit 603 receiving allowable range data from the user interface 606 outputs range correction values, which are stored in the storage unit 604 in advance and which are included in the aforementioned allowable ranges, ranges of chrominance x, chrominance y, and luminance Y of the video display device 605, luminance per each of correction values of R, G, B pixels, and variations of chrominance to the range correction calculation unit 607.

The range correction calculation unit 607 calculates optimum correction values based on the aforementioned input parameters and output them to the main control unit 603, which in turn controls the range correction unit 602 so as to display with the maximum luminance while maintaining the user's desired uniformity. In this connection, the method for calculating correction values included in allowable ranges is implemented in accordance with the flowchart of FIG. 3 described in conjunction with the first embodiment of the present invention.

According to the second embodiment of the present invention described above, luminance ranges of the display screen are not corrected in view of the appearance but can be corrected based on numerical values. This allows the video display device to manage luminance ranges based on numerical values.

The second embodiment of the present invention describes the provision of the on-screen menu as the user interface, whereas the on-screen menu is not a restriction; hence, it is possible to acquire information from an external device via a communication means or to store it in the storage unit 604 in advance. The second embodiment of the present invention describes only the allowable ranges of the chrominance x, chrominance y, and luminance Y, whereas it is obvious that a similar effect can be obtained by replacing them with other color-coordinates spaces. It is not necessary to store the ranges of the chrominance x, chrominance y, and luminance Y of the video display unit 605 in the storage unit 604; that is, it is obvious that the ranges of the chrominance x, chrominance y, and luminance Y of the video display unit 605 in a non-correction mode can be calculated based on correction values of R, C; B in a 100% correction mode if the luminance per each of correction values of R, G, B pixels and chrominance variations are determined.

As described above, the present invention can perform desired luminance correction while visually recognizing actual corrections of luminance ranges and luminance reductions. In this case, processing is performed and given a top priority on luminance ranges of the display device and reductions of chrominance ranges rather than luminance reductions; thus, it is possible to correct irregularities of ranges in an early stage.

The interface by which the user inputs luminance ranges and chrominance ranges is provided, and the control device (main control units 103 and 603) calculates the corresponding optimum values, whereby it is possible to minimize luminance reductions while correction luminance ranges in response to conditions designated by the user. That is, it is possible to minimize luminance reductions while suiting various standards of uniformity.

INDUSTRIAL APPLICABILITY

The present invention is adapted to video display devices which can correct luminance ranges, wherein luminance ranges are corrected based on correction values regarding the correction level information input by the user interface, thus, it is possible to correct luminance ranges to suite the user's preference without causing relatively large luminance reductions.

The invention claimed is:

1. A video display device comprising:
a video processing unit for processing input video signals;
a video display unit for displaying processed video signals output from the video processing unit;
a storage unit for storing correction values for correcting luminance ranges of display pixels in the video display unit;
a range correction unit for correcting the luminance ranges of the video display unit based on the processed video signals output from the video processing unit;
a user interface for making the correction values set to the range correction unit variable; and
a main control unit for controlling the range correction unit by acquiring the correction values from the storage unit in accordance with the correction level information input by the user interface,
wherein the main control unit acquires the correction level information input via the user interface, calculates ideal luminance range distribution characteristics based on ideal luminance distribution characteristics approximating standard luminance distributions of the video display unit, and calculates an optimized correction value corresponding to the acquired correction level information based on a correlation between a 100% luminance range correction value at certain point and a 100% luminance range correction value of a display screen of the video display unit based on the ideal luminance range distribution characteristics, thus outputting it to the range correction unit.

2. A video display device according to claim 1, wherein the storage unit stores the correction values for the video display unit in correspondence with correction level information input and acquired via the user interface.

3. A video display device according to claim 1, wherein the storage unit stores a single correction value, and wherein the main control unit acquires the correction values from the storage unit so as to calculate a plurality of range correction values in accordance with the correction level information acquired by the user interface, thus outputting it to the range correction unit.

4. A video display device according to claim 1, wherein the storage unit stores n correction values (n is a positive integer), and wherein the main control unit calculates correction values based on the n correction values in accordance with m pieces of correction level information (where m>n) input and acquired by the user interface, thus outputting them to the range correction unit.

5. A video display device according to claim 1, wherein the main control unit calculates the ideal luminance distribution characteristics with respect to each video display unit to be used.

6. A video display device according to claim 1, wherein the main control unit further performs a filter operation so as to extract and smooth pixels having large variations of luminance ranges in the video display unit.

7. A video display device according to claim 5, wherein the main control unit further performs a filter operation so as to extract and smooth pixels having large variations of luminance ranges in the video display unit.

8. A video display device comprising:
a video processing unit for processing input video signals;
a video display unit for displaying processed video signals output from the video processing unit;
a storage unit for storing correction values for correcting luminance ranges of display pixels in the video display unit;
a range correction unit for correcting the luminance ranges of the video display unit based on the processed video signals output from the video processing unit;
a user interface for inputting allowable luminance ranges input thereto;
a main control unit for acquiring the correction values from the storage unit based on the allowable luminance ranges input by the user interface, thus outputting them to a range correction calculation unit; and
the range correction calculation unit for acquiring the correction values from the storage unit under control of the main control unit and for calculating the correction values within the allowable luminance ranges input by the user interface.

9. A video display device according to claim 8, wherein the user interface inputs information regarding either luminance or chrominance or both the luminance and the chrominance as the allowable luminance ranges so as to output the information to the main control unit.

10. A luminance range correction method adapted to a video display device in which a control unit acquires correction data for correcting luminance ranges of display pixels of a display device from a storage unit so as to correct individual luminance ranges of the display device, wherein the control unit comprises the steps of:

acquiring luminance range correction level information input by a user interface;

calculating ideal luminance range distribution characteristics based on ideal luminance distribution characteristics approximating standard luminance distributions of the display device;

based on the ideal luminance range distribution characteristics, calculating an optimized luminance range correction value corresponding to the acquired luminance range correction level based on a correlation between a 100% luminance range correction value at certain point and a 100% luminance range correction value in a display screen of the display device; and correcting individual luminance ranges of the display device based on the calculated luminance range correction value.

* * * * *